(12) United States Patent
Takagi

(10) Patent No.: US 10,792,915 B2
(45) Date of Patent: Oct. 6, 2020

(54) LIQUID DISCHARGE APPARATUS

(71) Applicant: Yasunobu Takagi, Kanagawa (JP)

(72) Inventor: Yasunobu Takagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/351,585

(22) Filed: Mar. 13, 2019

(65) Prior Publication Data

US 2019/0283403 A1    Sep. 19, 2019

(30) Foreign Application Priority Data

Mar. 16, 2018 (JP) ................................. 2018-050095

(51) Int. Cl.
*B41J 2/045* (2006.01)
*B41J 2/21* (2006.01)
*H04N 1/409* (2006.01)
*B29C 44/02* (2006.01)
*H04N 1/407* (2006.01)
(Continued)

(52) U.S. Cl.
CPC ......... *B41J 2/04541* (2013.01); *B29C 44/022* (2013.01); *B41J 2/04536* (2013.01); *B41J 2/04563* (2013.01); *B41J 2/04573* (2013.01); *B41J 2/04588* (2013.01); *B41J 2/2114* (2013.01); *B41J 2/2117* (2013.01); *H04N 1/4076* (2013.01); *H04N 1/4092* (2013.01); *B41J 2/04535* (2013.01); *B41J 2/04593* (2013.01); *B41J 2029/3935* (2013.01); *H04N 1/6097* (2013.01)

(58) Field of Classification Search
CPC .... B41J 2/04541; B41J 29/38; B41J 2/04573; B41J 2/04563

USPC ............................. 347/3, 12, 14, 15, 19, 20
See application file for complete search history.

(56) References Cited

U.S. PATENT DOCUMENTS

| | | | |
|---|---|---|---|
| 7,404,612 B2 * | 7/2008 | Takamiya | ............ B41J 2/04541 347/10 |
| 2013/0161874 A1 | 6/2013 | Horiuchi | |
| | | (Continued) | |

FOREIGN PATENT DOCUMENTS

| | | |
|---|---|---|
| JP | 56-157327 A | 12/1981 |
| JP | 11-277866 | 10/1999 |
| | (Continued) | |

OTHER PUBLICATIONS

Extended European Search Report dated Jul. 23, 2019 in European Patent Application No. 19162082.2, 10 pages.

*Primary Examiner* — An H Do
(74) *Attorney, Agent, or Firm* — Oblon, McClelland, Maier & Neustadt, L.L.P.

(57) ABSTRACT

A liquid discharge apparatus includes a liquid discharge head and processing circuitry. The liquid discharge head is configured to discharge, to a foamable medium, liquid having a function of suppressing foaming of the medium to form irregularities. The processing circuitry is configured to hold condition information indicating a content defined by each of a plurality of conditions related to image formation at a time when the liquid forms a predetermined pattern image on the medium; and generate and output, for each condition of the plurality of conditions, an evaluation medium on which irregularities corresponding to the predetermined pattern image formed according to the condition are formed.

13 Claims, 14 Drawing Sheets

(51) Int. Cl.
*B41J 29/393* (2006.01)
*H04N 1/60* (2006.01)

(56) References Cited

U.S. PATENT DOCUMENTS

| | | |
|---|---|---|
| 2017/0144339 A1 | 5/2017 | Horiuchi |
| 2017/0274584 A1 | 9/2017 | Fujimoto |
| 2018/0037033 A1 | 2/2018 | Tamura |
| 2018/0264692 A1 | 9/2018 | Horiuchi |

FOREIGN PATENT DOCUMENTS

| | | |
|---|---|---|
| JP | 2002-248838 | 9/2002 |
| JP | 2003-334933 | 11/2003 |
| JP | 2008-213427 | 9/2008 |
| JP | 2013-178353 A | 9/2013 |
| JP | 2014-100874 | 6/2014 |
| JP | 2014-137536 | 7/2014 |
| JP | 2016-64515 A | 4/2016 |

* cited by examiner

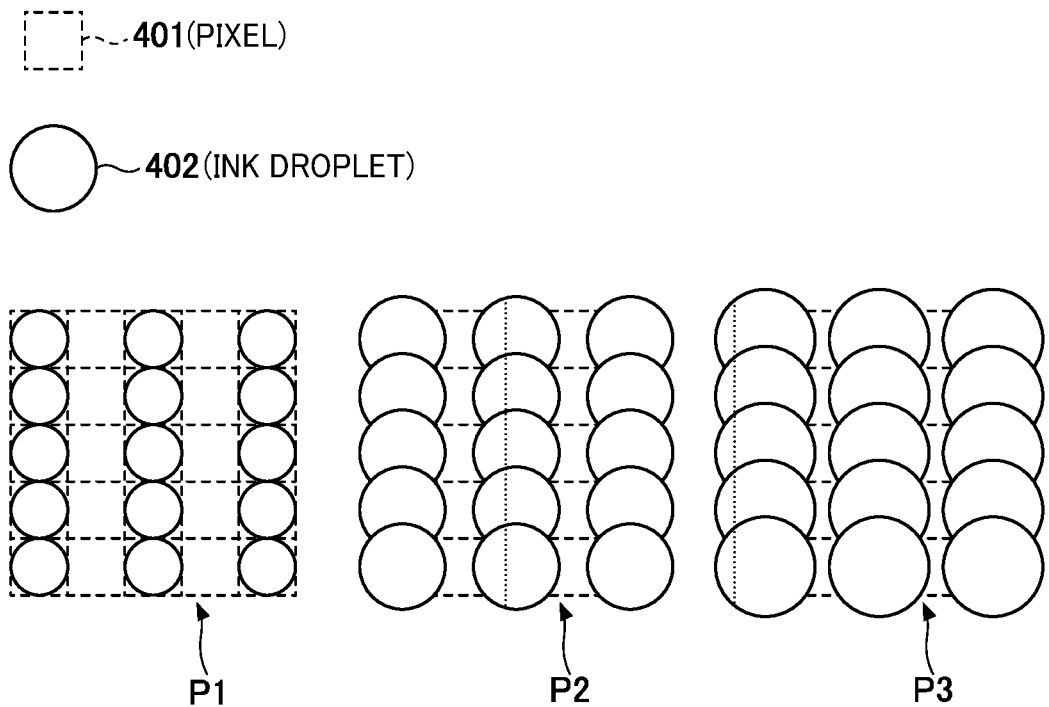

| | | PAIR LINE TYPE | | |
|---|---|---|---|---|
| | | ONE DOT | TWO DOTS | FOUR DOTS |
| OUTPUT CONDITION A | GRADATION VALUE | 100% | 100% | 100% |
| | EDGE PROCESSING | NONE | NONE | NONE |
| OUTPUT CONDITION B | GRADATION VALUE | 95% | 95% | 95% |
| | EDGE PROCESSING | NONE | NONE | NONE |
| OUTPUT CONDITION C | GRADATION VALUE | 90% | 90% | 90% |
| | EDGE PROCESSING | NONE | NONE | NONE |
| OUTPUT CONDITION D | GRADATION VALUE | 100% | 100% | 100% |
| | EDGE PROCESSING | CORRECTION 1 | CORRECTION 1 | CORRECTION 1 |
| OUTPUT CONDITION E | GRADATION VALUE | 95% | 95% | 95% |
| | EDGE PROCESSING | CORRECTION 1 | CORRECTION 1 | CORRECTION 1 |
| OUTPUT CONDITION F | GRADATION VALUE | 90% | 90% | 90% |
| | EDGE PROCESSING | CORRECTION 1 | CORRECTION 1 | CORRECTION 1 |
| OUTPUT CONDITION G | GRADATION VALUE | 100% | 100% | 100% |
| | EDGE PROCESSING | CORRECTION 2 | CORRECTION 2 | CORRECTION 2 |
| OUTPUT CONDITION H | GRADATION VALUE | 95% | 95% | 95% |
| | EDGE PROCESSING | CORRECTION 2 | CORRECTION 2 | CORRECTION 2 |
| OUTPUT CONDITION I | GRADATION VALUE | 90% | 90% | 90% |
| | EDGE PROCESSING | CORRECTION 2 | CORRECTION 2 | CORRECTION 2 |
| OUTPUT CONDITION J | GRADATION VALUE | 100% | 100% | 100% |
| | EDGE PROCESSING | CORRECTION 3 | CORRECTION 3 | CORRECTION 3 |
| OUTPUT CONDITION K | GRADATION VALUE | 95% | 95% | 95% |
| | EDGE PROCESSING | CORRECTION 3 | CORRECTION 3 | CORRECTION 3 |
| OUTPUT CONDITION L | GRADATION VALUE | 90% | 90% | 90% |
| | EDGE PROCESSING | CORRECTION 3 | CORRECTION 3 | CORRECTION 3 |

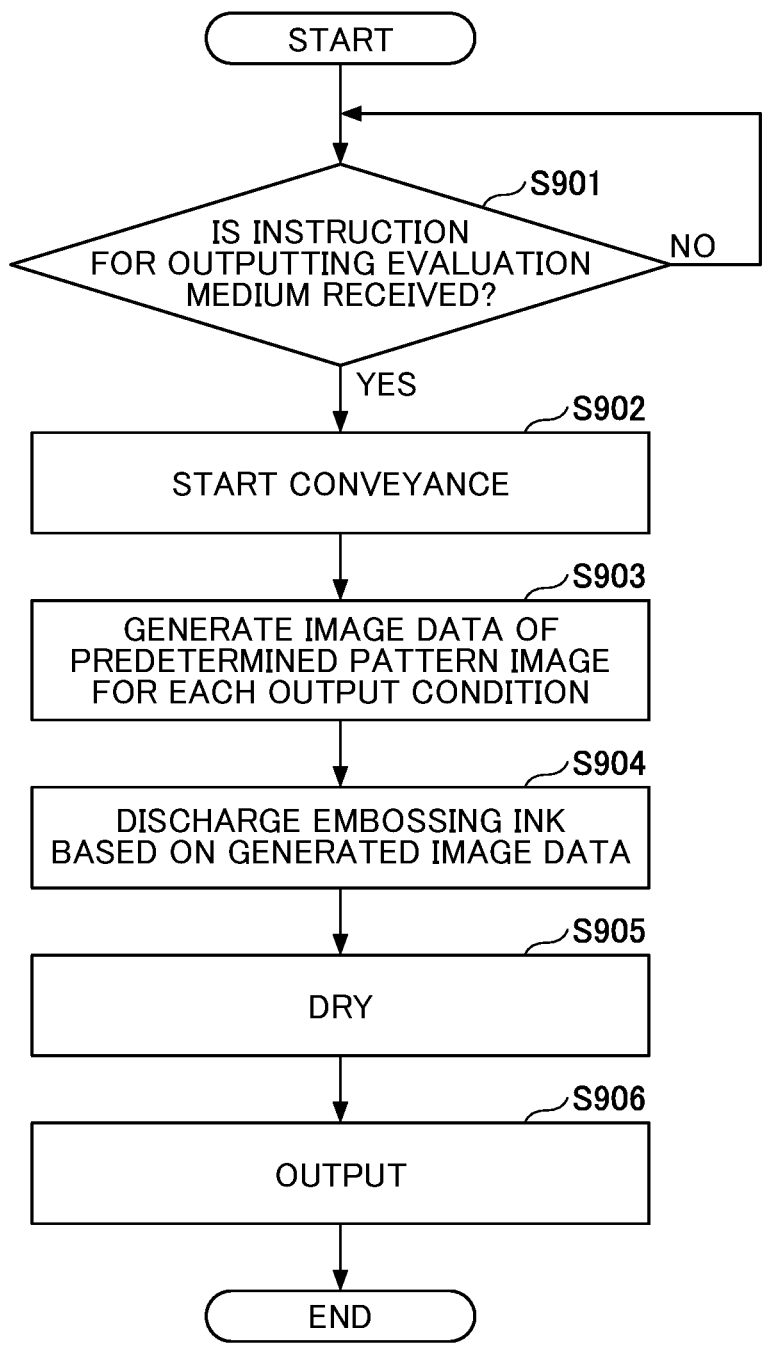

|  | PAIR LINE TYPE | | |
| --- | --- | --- | --- |
|  | ONE DOT | TWO DOTS | FOUR DOTS |
| OUTPUT CONDITION A | FAIR | FAIR | FAIR |
| OUTPUT CONDITION B | FAIR | FAIR | FAIR |
| OUTPUT CONDITION C | POOR | POOR | FAIR |
| OUTPUT CONDITION D | FAIR | FAIR | GOOD |
| OUTPUT CONDITION E | FAIR | FAIR | GOOD |
| OUTPUT CONDITION F | FAIR | GOOD | GOOD |
| OUTPUT CONDITION G | FAIR | GOOD | GOOD |
| OUTPUT CONDITION H | GOOD | GOOD | GOOD |
| OUTPUT CONDITION I | FAIR | GOOD | GOOD |
| OUTPUT CONDITION J | FAIR | GOOD | GOOD |
| OUTPUT CONDITION K | FAIR | GOOD | GOOD |
| OUTPUT CONDITION L | POOR | GOOD | GOOD |

FIG. 13

| | PAIR LINE TYPE | | | TOTAL POINTS |
|---|---|---|---|---|
| | ONE DOT | TWO DOTS | FOUR DOTS | |
| OUTPUT CONDITION A | DEPTH 3<br>EDGE 1<br>CRUSHING 1 | DEPTH 3<br>EDGE 1<br>CRUSHING 1 | DEPTH 3<br>EDGE 1<br>CRUSHING 2 | 16 |
| OUTPUT CONDITION B | DEPTH 3<br>EDGE 1<br>CRUSHING 1 | DEPTH 3<br>EDGE 1<br>CRUSHING 1 | DEPTH 3<br>EDGE 1<br>CRUSHING 2 | 16 |
| OUTPUT CONDITION C | DEPTH 2<br>EDGE 1<br>CRUSHING 1 | DEPTH 2<br>EDGE 1<br>CRUSHING 2 | DEPTH 2<br>EDGE 1<br>CRUSHING 3 | 15 |
| OUTPUT CONDITION D | DEPTH 3<br>EDGE 2<br>CRUSHING 1 | DEPTH 3<br>EDGE 2<br>CRUSHING 1 | DEPTH 3<br>EDGE 2<br>CRUSHING 2 | 19 |
| OUTPUT CONDITION E | DEPTH 3<br>EDGE 2<br>CRUSHING 1 | DEPTH 3<br>EDGE 2<br>CRUSHING 1 | DEPTH 3<br>EDGE 2<br>CRUSHING 2 | 19 |
| OUTPUT CONDITION F | DEPTH 3<br>EDGE 2<br>CRUSHING 1 | DEPTH 3<br>EDGE 2<br>CRUSHING 2 | DEPTH 3<br>EDGE 2<br>CRUSHING 3 | 21 |
| OUTPUT CONDITION G | DEPTH 3<br>EDGE 2<br>CRUSHING 1 | DEPTH 3<br>EDGE 2<br>CRUSHING 2 | DEPTH 3<br>EDGE 2<br>CRUSHING 3 | 21 |
| OUTPUT CONDITION H | DEPTH 3<br>EDGE 2<br>CRUSHING 2 | DEPTH 3<br>EDGE 3<br>CRUSHING 3 | DEPTH 3<br>EDGE 3<br>CRUSHING 3 | 25 |
| OUTPUT CONDITION I | DEPTH 2<br>EDGE 2<br>CRUSHING 2 | DEPTH 2<br>EDGE 3<br>CRUSHING 3 | DEPTH 2<br>EDGE 3<br>CRUSHING 3 | 22 |
| OUTPUT CONDITION J | DEPTH 3<br>EDGE 2<br>CRUSHING 2 | DEPTH 3<br>EDGE 2<br>CRUSHING 3 | DEPTH 3<br>EDGE 2<br>CRUSHING 3 | 23 |
| OUTPUT CONDITION K | DEPTH 2<br>EDGE 2<br>CRUSHING 2 | DEPTH 2<br>EDGE 3<br>CRUSHING 3 | DEPTH 2<br>EDGE 3<br>CRUSHING 3 | 22 |
| OUTPUT CONDITION L | DEPTH 1<br>EDGE 2<br>CRUSHING 1 | DEPTH 2<br>EDGE 3<br>CRUSHING 2 | DEPTH 2<br>EDGE 3<br>CRUSHING 2 | 18 |

LIQUID DISCHARGE APPARATUS

CROSS-REFERENCE TO RELATED APPLICATION

This patent application is based on and claims priority pursuant to 35 U.S.C. § 119(a) to Japanese Patent Application No. 2018-050095, filed on Mar. 16, 2018, in the Japan Patent Office, the entire disclosure of which is hereby incorporated by reference herein.

BACKGROUND

Technical Field

The present disclosure relates to a liquid discharge apparatus.

Related Art

Conventionally, it has been known that emboss processing is applied to a polyvinyl chloride (PVC) sheet or the like to use it for protection of a surface of a wall, floor, furniture, and the like.

Examples of known methods of the emboss processing include a technique in which a foaming inhibitor is adhered or permeated to a surface of a foaming textile stuff (media) in a predetermined pattern using a printing method of an on-demand type such as thermal transfer, inkjet, electrophotography, and electrostatic plotter, and then the foaming textile stuff is foamed.

SUMMARY

In an aspect of the present disclosure, there is provided a liquid discharge apparatus that includes a liquid discharge head and processing circuitry. The liquid discharge head is configured to discharge, to a foamable medium, liquid having a function of suppressing foaming of the medium to form irregularities. The processing circuitry is configured to hold condition information indicating a content defined by each of a plurality of conditions related to image formation at a time when the liquid forms a predetermined pattern image on the medium; and generate and output, for each condition of the plurality of conditions, an evaluation medium on which irregularities corresponding to the predetermined pattern image formed according to the condition are formed.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 4A and 4B are diagrams illustrating a manner of adhesion of embossing ink onto a discharge target object;

FIG. 7 is a table illustrating exemplary output condition information according to the first embodiment;

FIG. 9 is a flowchart illustrating a process of the liquid discharge apparatus according to the first embodiment;

FIG. 12 is a first table illustrating exemplary evaluation result information according to the second embodiment;

FIG. 13 is a second table illustrating exemplary evaluation result information according to the second embodiment.

Figure 1:
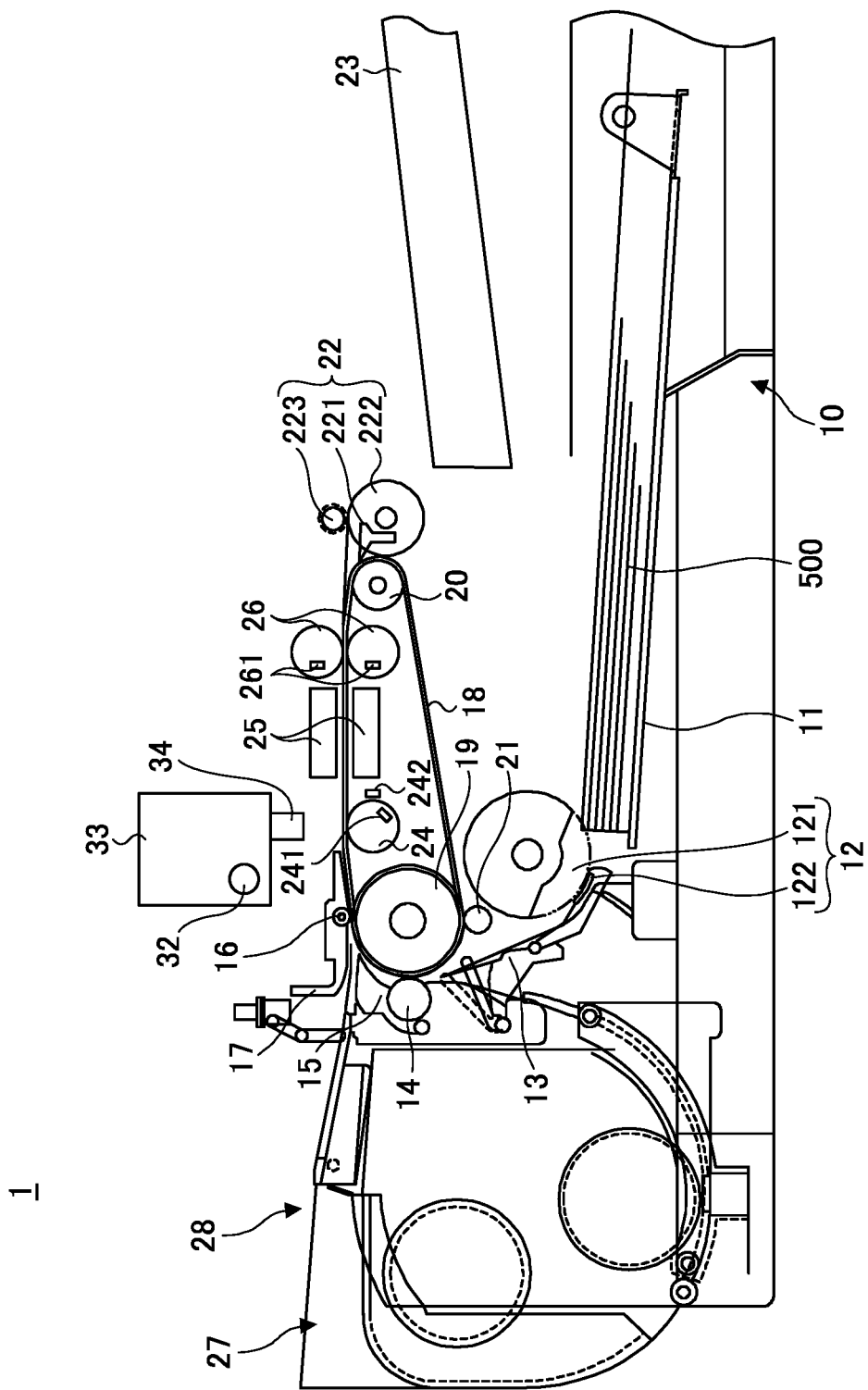
FIG. 1 is a side view exemplifying a schematic configuration of a liquid discharge apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

First Embodiment

Figure 2:
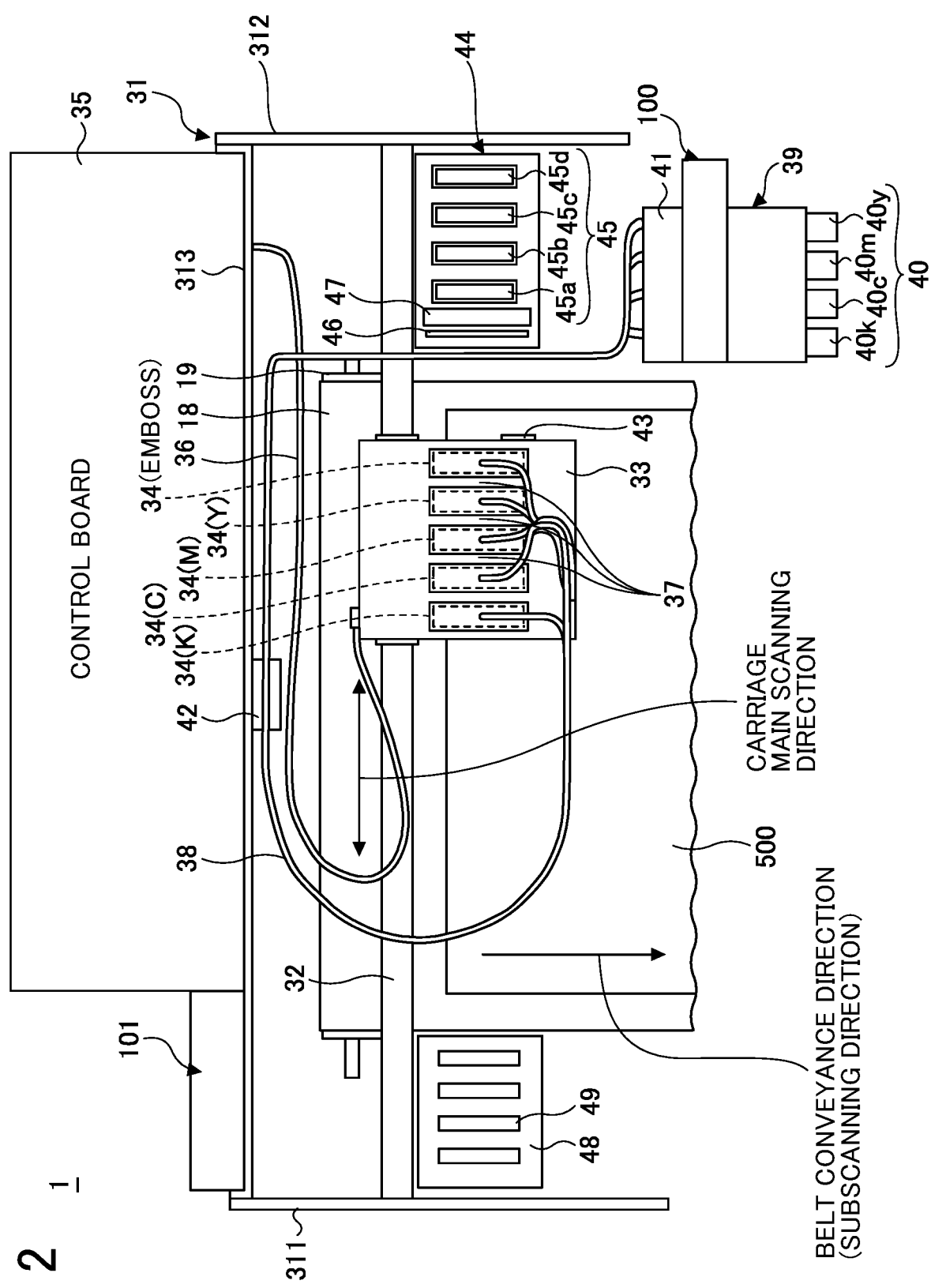
FIG. 2 is a partial plan view exemplifying the vicinity of a carriage of the liquid discharge apparatus according to the first embodiment.

Hereinafter, a first embodiment will be described referring to the accompanying drawings. FIG. 1 is a side view exemplifying a schematic configuration of a liquid discharge apparatus according to the first embodiment. FIG. 2 is a partial plan view exemplifying the vicinity of a carriage of the liquid discharge apparatus according to the first embodiment.

As illustrated in FIGS. 1 and 2, a liquid discharge apparatus 1 includes a supply unit 12 for supplying discharge target objects 500 stacked on a discharge target object stacker 11 of a supply tray 10. The supply unit 12 includes a semicircular roller (supply roller) 121 that separates and feeds the discharge target objects (media) 500 one by one from the discharge target object stacker 11, and a separating pad 122 that is made of a material having a large friction coefficient and faces the supply roller 121, and the separating pad 122 is pressed toward the supply roller 121.

Note that the discharge target object 500 according to the present embodiment may include a foaming agent. Specifically, the discharge target object 500 according to the present embodiment may be a medium in which a vinyl chloride resin in a sol state is applied onto a polyvinyl chloride (PVC) sheet as a base material using a coater, for example.

The vinyl chloride resin contains a foaming agent, and foams and solidifies by heating. The foaming agent may be contained in the vinyl chloride resin in the sol state to be applied, or may be contained in the PVC sheet as the base material. Further, the discharge target object 500 according to the present embodiment may be an object in which a material containing a foaming agent is laminated on a base material and a vinyl chloride resin in a sol state.

In the present embodiment, an exemplary case where ink and embossing ink as a foaming inhibitor having a function of suppressing foaming of the vinyl chloride resin are used as a liquid to be discharged and an image and irregularities are formed on the discharge target object 500 will be described.

Specifically, in the present embodiment, the embossing ink having the function of suppressing foaming is attached to the discharge target object 500 containing the foaming agent, and then a dryer 25 to be described later dries the discharge target object 500 to foam the discharge target object 500, thereby forming irregularities on the discharge target object 500. Note that the irregularities formed on the discharge target object 500 are referred to as an embossed image.

The liquid discharge apparatus 1 includes a guide member 13 that guides the discharge target object 500 to send the discharge target object 500 supplied from the supply unit 12 toward the lower side of a liquid discharge head 34, a counter roller 14, a conveyance guide member 15, and a pressing member 17 including a leading end pressing roller 16. The liquid discharge apparatus 1 further includes a conveying belt 18 as a conveyance means that electrostatically attracts the fed discharge target object 500 to convey it at a position facing the liquid discharge head 34.

The conveying belt 18 is an endless belt, which is wound around a conveying roller 19 and a tension roller 20 to circulate in the conveyance direction (sub-scanning direction) of the belt. The conveying belt 18 includes, for example, a surface layer to be a discharge target object attraction surface made of a pure resin material having a thickness of about 40 μm, which is not subject to resistance control, such as an ethylene tetra fluoro-ethylene (ETFE) pure material, and a back layer (medium resistance layer and a grounding layer) made of the material same as the material of the surface layer, which is subject to resistance control using carbon.

The liquid discharge apparatus 1 includes a charging roller 21 as a charging means that charges the surface of the conveying belt 18. The charging roller 21 is in contact with the surface layer of the conveying belt 18, disposed to rotate following the rotation of the conveying belt 18, and applies a predetermined pressure to both ends of the shaft. The conveying roller 19 also serves as a grounding roller, which is disposed to be in contact with the medium resistance layer (back layer) of the conveying belt 18 and is grounded.

The conveying belt 18 rotates and drives the conveying roller 19 using a sub-scanning motor, and circularly moves rightward in FIG. 1 and downward in FIG. 2 (belt conveyance direction illustrated by the arrow). The moving direction of the conveying belt 18 is the sub-scanning direction of a carriage 33, which is orthogonal to the main-scanning direction of the carriage 33.

The liquid discharge apparatus 1 includes an ejector 22 for ejecting the discharge target object 500 baring a predetermined structure formed by the ink and the embossing ink discharged from the liquid discharge head 34 according to image data. The ejector 22 includes a separation claw 221 for separating the discharge target object 500 from the conveying belt 18, an ejecting roller 222, and an ejection roller 223. Below the ejecting roller 222, an ejection tray 23 is provided.

Between the conveying roller 19 and the tension roller 20, there are sequentially disposed, in the sub-scanning direction, a heating-mechanism-equipped coating stage roll 24, a dryer 25, and a heating-mechanism-equipped press roll 26.

The heating-mechanism-equipped coating stage roll 24, which is a heating unit, is disposed immediately below the liquid discharge head 34. In other words, the heating-mechanism-equipped coating stage roll 24 is disposed at the position facing the liquid discharge head 34 via the conveying belt 18.

The heating-mechanism-equipped coating stage roll 24 heats the discharge target object 500 conveyed on the conveying belt 18 using a built-in heater 241, for example. By heating the discharge target object 500, evaporation of the solvent of the ink arrived on the discharge target object 500 can be started at an early stage. In the vicinity of the heating-mechanism-equipped coating stage roll 24, a temperature sensor 242 that detects the temperature of the heating-mechanism-equipped coating stage roll 24 is disposed. The temperature of the heating-mechanism-equipped coating stage roll 24 can be controlled within a predetermined range according to the temperature detected by the temperature sensor 242.

A pair of the dryers 25 that dries the ink discharged on the discharge target object 500 may be disposed at a stage later than the liquid discharge head 34 in the sub-scanning direction in which the discharge target object 500 is conveyed. The pair of dryers 25 are disposed at positions facing each other with the conveying belt 18 interposed therebetween, for example. The pair of dryers 25 can heat and dry the ink discharged on the discharge target object 500 conveyed on the conveying belt 18 using, for example, infrared rays or hot air.

For example, in a case where the ink contains a solvent easily volatilized and a solvent hardly volatilized, the heating-mechanism-equipped coating stage roll 24 heats the discharge target object 500 so that the solvent easily volatilized evaporates and the viscosity of the ink increases, whereby the discharge target object 500 can be made difficult for the ink to permeate. Thereafter, the solvent hardly volatilized can be evaporated using the dryer 25 and can be completely dried.

In this manner, the heating-mechanism-equipped coating stage roll 24 and the dryer 25 heat to evaporate the ink discharged on the discharge target object 500 from the liquid discharge head 34 and the solvent of the embossing ink, and the ink is dried. However, the dryer 25 may not be disposed in a case where the ink discharged on the discharge target object 500 from the liquid discharge head 34 and the solvent of the embossing ink can be evaporated only by the heating-mechanism-equipped coating stage roll 24.

A pair of the heating-mechanism-equipped press rolls 26, which is a heating-mechanism-equipped pressing unit for heating and pressing the dried ink, may be disposed at a stage later than the liquid discharge head 34 in the sub-scanning direction in which the discharge target object 500 is conveyed. The pair of heating-mechanism-equipped press rolls 26 are disposed at positions facing each other with the conveying belt 18 interposed therebetween, for example.

The heating-mechanism-equipped press rolls 26 facing each other hold the discharge target object 500 conveyed on the conveying belt 18 while the dried ink on the discharge target object 500 is heated by, for example, a built-in heater 261 of the heating-mechanism-equipped press roll 26, thereby pressing the dried ink on the discharge target object 500. This makes it possible to reduce variations in thickness of the ink dried on the discharge target object 500. The heating-mechanism-equipped press roll 26 may be disposed as necessary. For example, the heating-mechanism-equipped press roll 26 may not be disposed in a case where the accuracy of the ink thickness is not important.

The liquid discharge apparatus 1 has a double-sided unit 27 detachably attached to the back side thereof. This double-sided unit 27 takes in and reverses the discharge target object 500 returned by the reverse rotation of the conveying belt 18, and supplies it again between the counter roller 14 and the conveying belt 18. The upper surface of the double-sided unit 27 is a manual sheet feeding tray 28.

As illustrated in FIG. 2, side plates 311 and 312 included in a frame 31 are disposed on the right and left side surfaces of the liquid discharge apparatus 1 in the vicinity of the carriage 33. A guide rod 32 laterally bridges the side plates 311 and 312. The carriage 33 is slidably held by the guide rod 32 in the main-scanning direction. The carriage 33 is moved and scanned by a main scanning motor in the carriage main-scanning direction indicated by the arrow in FIG. 2 via a timing belt.

The liquid discharge head 34 is attached to the carriage 33 with the discharging direction directed downward (toward conveying belt 18). In the liquid discharge head 34, for example, a nozzle row including a plurality of nozzles for discharging ink is arrayed in the sub-scanning direction orthogonal to the main-scanning direction.

For example, five inkjet heads serving as the liquid discharge heads 34 that discharge ink droplets of respective colors yellow (Y), cyan (C), magenta (M), and black (K), and ink droplets of the embossing ink can be arrayed along the main-scanning direction.

The liquid discharge head 34 may include a pressure generating means that generates pressure for discharging ink. Specific examples of the pressure generating means include a piezoelectric actuator such as a piezoelectric element, a thermal actuator utilizing a phase change due to film boiling of liquid using an electrothermal conversion element such as a heating resistor, a shape-memory-alloy actuator using a metal phase change due to a temperature change, and an electrostatic actuator using electrostatic force.

The liquid discharge head 34 includes a driver IC, which is connected to a control board 35 via a harness (flexible printed cable, etc.) 36.

The carriage 33 includes a sub tank 37 that supplies liquid to the liquid discharge head 34. Liquid is supplied and refilled from a cartridge 40 detachably attached to a cartridge loading unit 39 to the sub tank 37 via an ink supply tube 38. The cartridge 40 includes cartridges 40k, 40c, 40m, and 40y for respective colors of yellow (Y), cyan (C), magenta (M), and black (K), for example. The cartridge loading unit 39 is provided with a supply pump unit 41 for sending ink in the cartridge 40. The ink supply tube 38 is held on, using a holding member 42, a rear plate 313 included in the frame 31 in the middle of its laying body.

In a case where the inside temperature rises during printing or standby, a start/stop of a fan 101 disposed on the frame 31 on the far side of the apparatus near the control board 35 and the like is controlled, whereby the temperature of the liquid discharge head 34 and the temperature throughout the inside of the apparatus can be decreased.

Further, a start/stop of a fan 100 disposed in the vicinity of the cartridge loading unit 39 is controlled, whereby the liquid before being supplied to the liquid discharge head 34 can be cooled. In this case, the liquid cooled by the fan 100 is supplied to the liquid discharge head 34, and is discharged at a predetermined timing.

The liquid discharge head 34 may include a temperature sensor 43. In this case, the fan 100 as a cooler can be controlled to operate when the temperature of the liquid discharge head 34 detected by the temperature sensor 43 exceeds a preset upper limit temperature in comparing the temperature of the liquid discharge head 34 with the preset upper limit temperature. Further, the fan 100 can be controlled to stop when the temperature of the liquid discharge head 34 becomes lower than a preset lower limit temperature.

However, the fan 100 may operate constantly without the temperature sensor being attached to the liquid discharge head 34. In this case, it is sufficient to select the fan 100 having the cooling capability by which the temperature of the liquid discharge head 34 does not exceed the upper limit temperature on a constant basis.

A maintenance/recovery mechanism 44 that maintains condition of a nozzle of the liquid discharge head 34 and includes a recovery means for recovery is disposed in one non-printing area in the scanning direction of the carriage 33. The maintenance/recovery mechanism 44 includes a cap member 45 that caps each nozzle surface of the liquid discharge head 34, a wiper blade 46 that is a blade member for wiping (cleaning) the nozzle surface, an idle discharge receiver 47 that receives liquid droplets at a time when an idle discharge for discharging liquid droplets not contributing to recording is performed for the purpose of discharging thickened recording liquid, and the like. Here, a cap member 45a is used as a suction and moisture retaining cap, and other cap members 45b to 45d are used as moisture retaining caps.

A waste liquid of the recording liquid generated by the maintenance and recovery operation of the maintenance/recovery mechanism 44, the ink discharged to the cap member 45, the ink adhered to the wiper blade 46 and removed by a wiper cleaner, and the ink having been subject to the idle discharge to the idle discharge receiver 47 are ejected to a waste liquid tank and stored.

In the other non-printing area in the scanning direction of the carriage 33, an idle discharge receiver 48 that receives liquid droplets at the time when the idle discharge for discharging liquid droplets not contributing to recording is performed for the purpose of discharging thickened recording liquid during recording or the like is disposed. The idle discharge receiver 48 includes an opening 49 corresponding to the nozzle row of the liquid discharge head 34, and the like.

The liquid discharge apparatus 1 includes, on the rear side of the inside of its main body, a communication circuit (interface) such as a universal serial bus (USB) for exchanging data with the host, and a control circuit board included in a controller that controls the liquid discharge apparatus 1.

In the liquid discharge apparatus 1 having the configuration described above, the supply tray 10 separates and supplies the discharge target object 500 one by one, the discharge target object 500 supplied substantially vertically upward is guided by the guide member 13, sandwiched between the conveying belt 18 and the counter roller 14 and conveyed, the leading end thereof is further guided by the conveyance guide member 15 to be pressed to the conveying belt 18 by the leading end pressing roller 16, and the conveyance direction is changed by about 90 degrees.

At this time, a control circuit alternately repeats a positive output and a negative output from an AC bias supply unit to the charging roller 21, that is, alternating voltages are applied, and the conveying belt 18 is charged in the alternating charging voltage pattern, that is, plus and minus are alternately charged in a belt shape with a predetermined width in the sub-scanning direction that is the circumference direction. When the discharge target object 500 is fed onto the conveying belt 18 in which the plus and minus are alternately charged, the discharge target object 500 is attracted by the conveying belt 18, and the discharge target object 500 is conveyed in the sub-scanning direction by the circulating movement of the conveying belt 18.

Accordingly, the discharge target object 500 is stopped and ink is discharged from the liquid discharge head 34 according to an image signal while the carriage 33 moves by one row, thereby recording one row on the discharge target object 500. Upon completion of the recording of one row, the discharge target object 500 is conveyed for one row, and then recording of the next row is performed. Upon reception of a recording end signal or a signal indicating that the rear end of the discharge target object 500 has reached the recording area, the recording operation is terminated, and the discharge target object 500 is ejected to the ejection tray 23.

During printing (recording) standby, the carriage 33 is moved to the side of the maintenance/recovery mechanism 44, and the liquid discharge head 34 is capped by the cap member 45 so that the nozzle is kept in the wet state, thereby suppressing discharge failure caused by ink drying. Further, a suction pump sucks a part of the recording liquid from the nozzle (referred to as "nozzle suction" or "head suction") in the state where the cap member 45 caps the liquid discharge head 34, thereby performing recovery operation in which the thickened recording liquid and bubbles are ejected. Furthermore, idle discharge operation, which is for discharging ink not related to recording, is performed before starting the recording, during the recording, and the like. As a result, stable discharging performance of the liquid discharge head 34 is maintained.

Figure 3:
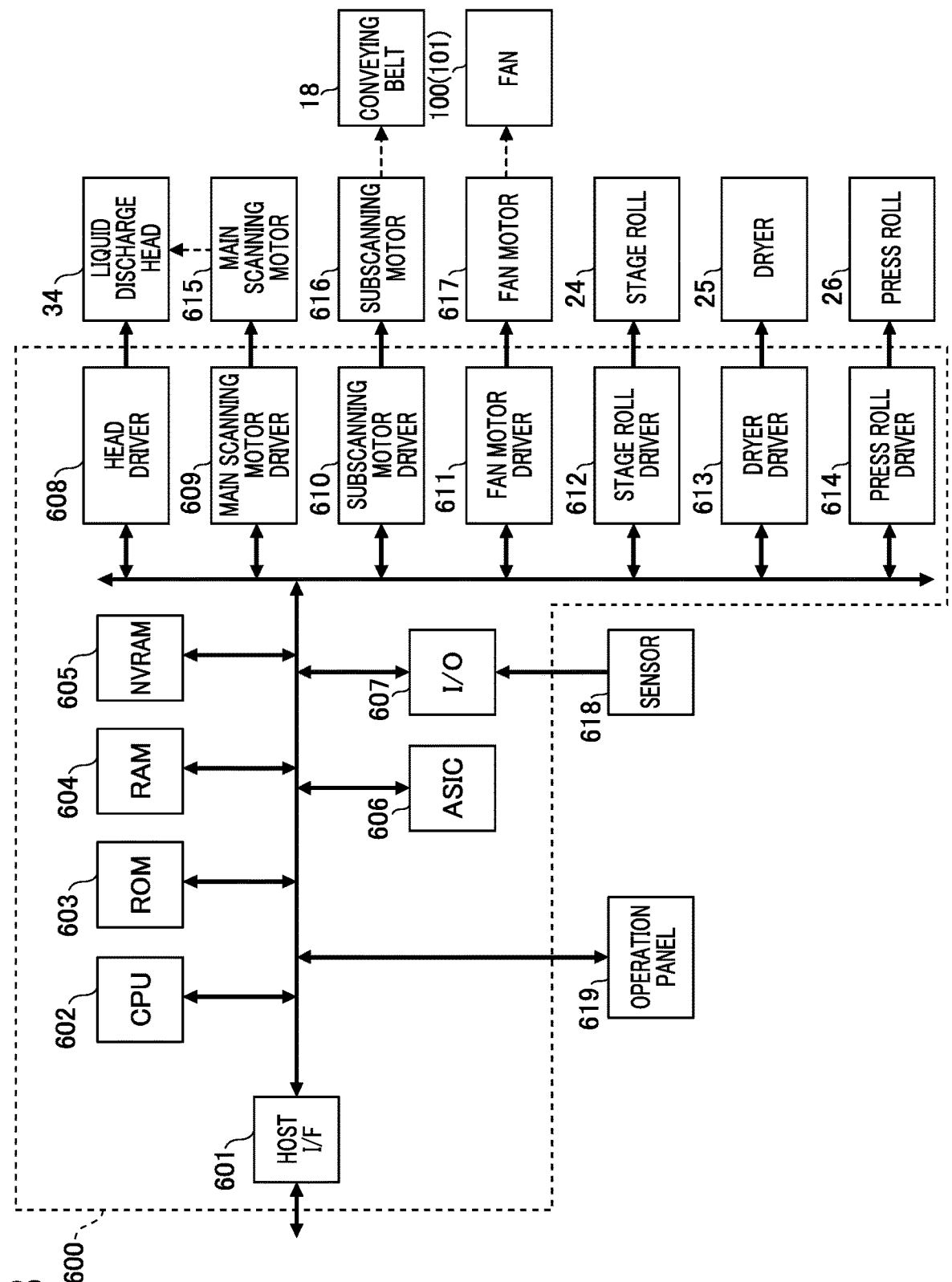
FIG. 3 is an exemplary hardware block diagram illustrating a main control mechanism of the liquid discharge apparatus according to the first embodiment.

FIG. 3 is an exemplary hardware block diagram illustrating a main control mechanism of the liquid discharge apparatus according to the first embodiment.

A controller 600 is disposed on the control board 35, for example. The controller 600 includes a CPU 602 that controls the entire liquid discharge apparatus 1, a read-only memory (ROM) 603 that stores a program to be executed by the CPU 602 and other fixed data, a random access memory (RAM) 604 that temporarily stores data related to the discharge target object 500 and the like, a non-volatile random access memory (NVRAM) 605 that is a non-volatile memory for holding data even while a power supply of the apparatus is shut down, and an application specific integrated circuits (ASIC) 606 that performs various kinds of processing on image data, image processing of executing rearrangement and the like, and other input/output signal processes for controlling the entire apparatus.

The controller 600 further includes a host interface (I/F) 601 that exchanges data and signals with the host side (data transmission side), a head driving unit 608 that controls the driving of the liquid discharge head 34, a main scanning motor driving unit 609 that drives a main scanning motor 615, a sub-scanning motor driving unit 610 that drives a sub-scanning motor 616 for circularly moving the conveying belt 18, a fan motor driving unit 611 that drives a fan motor 617, a stage roll driving unit 612 that drives the heating-mechanism-equipped coating stage roll 24, a dryer driving unit 613 that drives the dryer 25, a press roll driving unit 614 that drives the heating-mechanism-equipped press roll 26, an I/O 607 that inputs detection signals from various sensors 618, and the like. Besides, the controller 600 is connected to an operation panel 619 for inputting and displaying information necessary for this apparatus.

The controller 600 receives, at the host I/F 601, print data and the like from the host side such as an information processing apparatus such as a personal computer, an image reading apparatus such as an image scanner, and an image pickup apparatus such as a digital camera via a cable or a net.

Then, the CPU 602 reads and analyzes data in the reception buffer included in the host I/F 601, performs necessary processing (data rearrangement processing, etc.) using the ASIC 606, and transfers the data to the head driving unit 608. Generation of dot pattern data for discharging the ink may be performed by storing data in the ROM 603, for example, or by developing the data into bitmap data using a printer driver on the host side and transferring the data to this apparatus.

Upon reception of the image data (dot pattern data) corresponding to one row of the liquid discharge head 34, the head driving unit 608 synchronizes the dot pattern data of one row with a clock signal, transmits it to the liquid discharge head 34 as serial data, and transmits a latch signal to the liquid discharge head 34 at a predetermined timing.

The head driving unit 608 includes a ROM (that can be formed of the ROM 603) storing pattern data of a driving waveform (driving signal), a waveform generating circuit including a D/A converter that executes D/A conversion on the data of the driving waveform read from the ROM, and a driving waveform generating circuit including an amplifier or the like.

In the liquid discharge apparatus 1 according to the present embodiment, the liquid discharge head 34 discharges the embossing ink to the discharge target object 500 in a similar manner to the ink of four colors, whereby the manner of adhesion of the embossing ink onto the discharge target object 500 can be considered in a similar manner to those of the other inks of C, M, Y, and K. The manner of adhesion of the embossing ink onto the discharge target object 500 is in relation with the manner of suppressing foaming of the discharge target object 500 using the embossing ink.

In addition, the discharge target object 500 according to the present embodiment is a PVC sheet before being cured, and the embossing ink that is a liquid is adhered to the uncured discharge target object 500.

Therefore, in the present embodiment, the manner of permeation and spreading of the embossing ink on the discharge target object 500 largely influences the manner of foaming of the discharge target object 500. Specifically, the manner of foaming of the discharge target object 500 varies depending on a type, thickness, viscosity, heating condition, and the like of the discharge target object 500, for example.

In the present embodiment, as described above, the influence exerted by the discharge target object 500 side in the case where the embossing ink that is a liquid is discharged onto the discharge target object 500 before curing is also focused, and the liquid discharge apparatus 1 is caused to output an evaluation medium with irregularities of a predetermined pattern formed under various output conditions. A user of the liquid discharge apparatus 1 can select an output condition corresponding to a pattern of irregularities desired by the user and set it in the liquid discharge apparatus 1 by referring to the evaluation medium. Therefore, according to the present embodiment, reproducibility of the irregularities desired by the user can be improved.

In other words, according to the present embodiment, it is possible to improve the reproducibility of the irregularities reflecting both of the influence exerted by the manner of adhesion of the embossing ink on the discharge target object 500 and the influence exerted by the manner of spreading and permeation of the embossing ink on the discharge target object 500.

Note that the output condition in the present embodiment is a condition related to image formation in forming the pattern image for forming the irregularities on the discharge target object 500 using the embossing ink. In other words, the output condition is a condition related to the image formation in forming an image of an embossing plate using the embossing ink.

Hereinafter, the manner of adhesion of the embossing ink onto the discharge target object will be described referring to FIGS. 4A and 4B. FIGS. 4A and 4B are diagrams illustrating the manner of adhesion of the embossing ink onto the discharge target object. FIG. 4A is a diagram illustrating an example a pattern formed by discharging the embossing ink onto the discharge target object 500 at an interval of one dot. FIG. 4B is a table illustrating comparison between the size of the ink droplet of the embossing ink and the state of the irregularities.

As illustrated in FIG. 4A, while each pixel 401 of image data is rectangular, an ink droplet 402 of the embossing ink discharged from the liquid discharge head 34 arrives on the discharge target object 500 in a shape nearly circular.

In the case of a normal color image, when the dot diameter of the ink droplet 402 is too small, the coating cannot be filled, whereby image stripes are generated or sufficient density cannot be obtained. On the other hand, when the dot diameter is too large, fine image details such as thin lines are crushed.

This also applies to the case of the embossing ink. In FIG. 4A, a pattern P1 illustrates a case where the dot diameter of the ink droplet is small with the dot diameter of the ink droplet in a pattern P2 serving as a standard, and a pattern P3 illustrates a case where the dot diameter of the ink droplet is large.

As illustrated in FIG. 4B, when the dot diameter is small, while it is suitable for presenting fine irregularities, foaming of the discharge target object 500 cannot be sufficiently suppressed, whereby the adhesion portion (recessed portion) of the ink droplet may not be flat or the depth of the irregularities may be insufficient. Meanwhile, when the dot diameter is large, while the adhesion portion (recessed portion) of the ink droplet is flat and the depth of the irregularities is sufficient, a portion to be left as a projected portion is also recessed, whereby it is not suitable for the case of presenting fine irregularities.

The state of the irregularities will be further described referring to FIGS. 5A to 5E. FIGS. 5A to 5E are views illustrating a state of irregularities caused by the embossing ink.

Figure 5A:
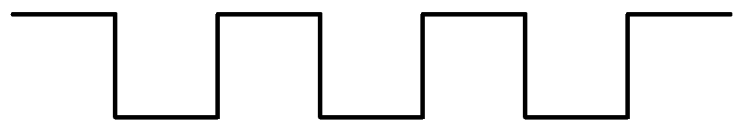
FIGS. 5A to 5E are views illustrating a state of irregularities caused by the embossing ink.
Figure 5B:

FIG. 5A illustrates an ideal state of the irregularities. On the other hand, FIG. 5B illustrates a state in which the amount of adhesion of the embossing ink is too large so that the ink droplets spread, whereby the projected portions are not high enough and the irregularities are crushed. Note that the case where the amount of adhesion of the embossing ink is large indicates the case where the dot diameter of the ink droplet is large.

Figure 5C:

FIG. 5C illustrates a state in which the adhesion of the embossing ink is small so that the recessed portions are not deep enough and the irregularities are crushed.

Figure 5D:
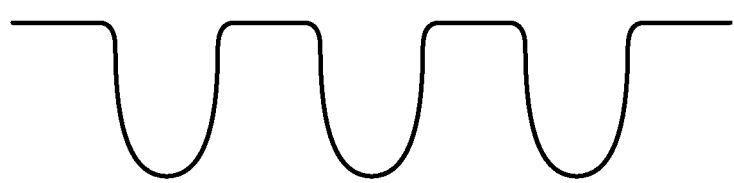
Figure 5E:

On the other hand, FIGS. 5D and 5E illustrate a state of comparatively favorable irregularities. The irregularities illustrated in FIG. 5D have recessed portions deeper than the recessed portions of the irregularities illustrated in FIG. 5E.

As described above, in the present embodiment, in the case where the embossing ink is adhered to the discharge target object 500 to form irregularities, the state of the irregularities is controlled by the dot diameter of the embossing ink, the amount of adhesion of the embossing ink, and the like.

Therefore, in the present embodiment, the evaluation medium having irregularities of a predetermined pattern is output for each of different output conditions so that the output condition for forming, for example, the irregularities of the state illustrated in FIGS. 5A, 5D, 5E, and the like can be selected.

Figure 6:
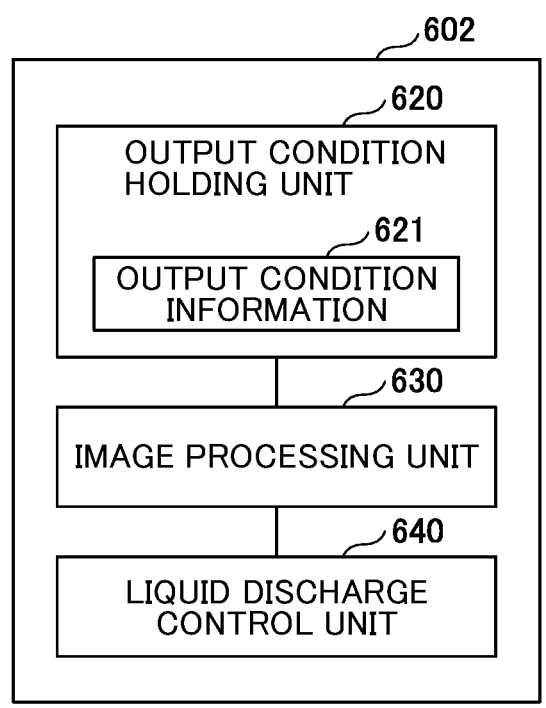
FIG. 6 is a diagram illustrating a function of a central processing unit (CPU) of the liquid discharge apparatus according to the first embodiment.

Hereinafter, a function of the CPU 602 of the liquid discharge apparatus 1 according to the present embodiment will be described referring to FIG. 6. FIG. 6 is a diagram illustrating a function of the CPU of the liquid discharge apparatus according to the first embodiment. The CPU 602 according to the present embodiment reads and executes a program stored in the ROM 603 or the like, thereby implementing processing of each unit to be described later.

The CPU 602 according to the present embodiment includes an output condition holding unit 620, an image processing unit 630, and a liquid discharge control unit 640.

The output condition holding unit 620 according to the present embodiment holds output condition information 621. Details of the output condition information 621 will be described later.

The image processing unit 630 generates predetermined pattern image data according to various output conditions included in the output condition information 621. More specifically, the image processing unit 630 generates image data of a predetermined pattern image formed by the embossing ink. In other words, the image processing unit 630 generates image data of an embossing plate. Note that the image processing unit 630 may generate image data of images formed by inks of respective colors C, M, Y, and K.

The liquid discharge control unit 640 controls the liquid discharge head 34 that discharges the embossing ink to form the generated predetermined pattern image, and generates and outputs the evaluation medium.

Next, the output condition information 621 according to the present embodiment will be described referring to FIG. 7. FIG. 7 is a table illustrating exemplary output condition information according to the first embodiment.

In the output condition information 621 according to the present embodiment, a one-dot pair line image, a two-dot pair line image, and a four-dot pair line image are set as a predetermined pattern image. The one-dot pair line image indicates an image in which lines are drawn at an interval of one dot, the two-dot pair line image indicates an image in which lines are drawn at an interval of two dots, and the four-dot pair line image indicates an image in which lines are drawn at an interval of four dots.

In the present embodiment, the predetermined pattern image is made to be the pair line image so that crushing of irregularities can be easily determined. In addition, in the present embodiment, a plurality of types of pair line images having different intervals is made to be the predetermined pattern so that the predetermined pattern image includes pattern images having different resolutions and spatial frequencies, whereby the state of the irregularities can be easily determined.

Note that the predetermined pattern image is not limited to the pair line image. For example, the predetermined pattern image may be any pattern image as long as the state of the irregularities can be confirmed. For example, the predetermined pattern image may be a pattern image such as a houndstooth pattern image, or may be a photography type image.

Further, in the output condition information 621, output conditions A to L are set for each predetermined pattern image. In the output conditions A to L, a gradation value for each predetermined pattern and a type of edge correction (edge processing) are set. Note that, in the output condition information 621, the gradation value is expressed as a relative value with the highest gradation value being set as 100%.

For example, the output condition A is a condition in which the gradation value is 100% and the edge correction is not performed with respect to three predetermined pattern images. The output condition D is a condition in which the gradation value is 100% and the edge correction of the type set as "correction 1" is performed with respect to the three predetermined pattern images. The output condition L is a condition in which the gradation value is 90% and the edge correction of the type set as "correction 3" is performed with respect to the three predetermined pattern images.

That is, in the output conditions A to L, information indicating the amount of adhesion of the embossing ink at the time when the embossing ink is discharged onto the discharge target object 500, and information associated with the edge correction of the image formed by the ink droplets are set.

In other words, the output condition according to the present embodiment includes the information indicating the amount of adhesion of the embossing ink onto the discharge target object 500, and the information associated with the shape of the outline of the image formed by the embossing ink, which is a condition defined by those pieces of information.

In addition, the output condition information 621 according to the present embodiment is information indicating contents defined by each of a plurality of output conditions.

The amount of adhesion of the embossing ink can be adjusted (changed) by, for example, changing a condition of the driving waveform used for driving the head and changing a size of the droplet discharged from the liquid discharge head 34. Specifically, the amount of adhesion of the embossing ink onto the discharge target object 500 may be adjusted by, for example, changing a type of the driving waveform or by changing a wave crest value.

Moreover, in a case where a multidrop can be discharged, the amount of adhesion of the embossing ink can be adjusted by changing a type of the droplet used for forming the image pattern. Specifically, in a case where a large droplet, a medium droplet, and a small droplet can be used, for example, the amount of adhesion of the embossing ink onto the discharge target object 500 may be adjusted by determining the size of the ink droplet used for forming the image.

Further, the amount of adhesion of the embossing ink may be adjusted by, for example, a method of changing the amount of adhesion of ink per unit area based on image processing, such as a halftone processing parameter and a y processing parameter.

Furthermore, in the present embodiment, the methods described above may be combined as a method of changing the amount of adhesion of the embossing ink.

The edge correction is implemented by the processing of changing the amount of adhesion of ink and a shape of the outline of the image. For example, the edge correction can be implemented by extracting the edge portion of the image by publicly known outline detection processing, performing pattern matching on the edge shape, adding or deleting pixels, and changing the droplet type. Details of the edge correction will be described later.

In the present embodiment, the edge is corrected so that the shape of the image outline of the embossing plate and the amount of adhesion of ink in the outline portion are controlled, whereby the depth and crushing of the irregularities can be controlled.

Figure 8A:
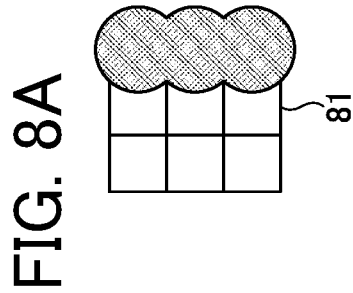
FIGS. 8A and 8B are diagrams illustrating edge correction.
Figure 8B:
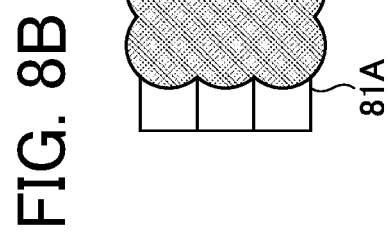

Hereinafter, the edge correction according to the present embodiment will be described referring to FIGS. 8A and 8B. FIGS. 8A and 8B are diagrams illustrating the edge correction. FIGS. 8A and 8B illustrate the edge correction in an area of 3 pixels×3 pixels. FIG. 8A illustrates an exemplary dot pattern based on original image data in the area of 3 pixels×3 pixels. FIG. 8B illustrates an exemplary dot pattern in the area of 3 pixels×3 pixels after the edge correction.

In a pattern 81 illustrated in FIG. 8A, dots are present in one row on the right side within the area of 3 pixels×3 pixels. FIG. 8B illustrates a result of performing various edge corrections on this pattern 81.

Patterns 81A and 81B in FIG. 8B illustrate a case where dots based on the original image data are not changed. Specifically, the pattern 81A illustrates an exemplary case where, to the dots based on the original image data, dots having a diameter larger than the diameter of the foregoing dots are added. The pattern 81B illustrates an exemplary case where, to the dots based on the original image data, dots having a diameter smaller than the diameter of the foregoing dots are added.

Patterns 81C and 81D in FIG. 8B illustrate a case where the dots based on the original image data are changed to dots having a smaller diameter. Specifically, the pattern 81C illustrates an exemplary case where the diameter of the dots based on the original image data is made smaller. The pattern 81D illustrates an exemplary case where the diameter of the dots based on the original image is made smaller and dots having a diameter smaller than the diameter of the original dots are added.

Patterns 81E and 81F in FIG. 8B illustrate a case where the dots based on the original image data are deleted. Specifically, the pattern 81E illustrates an exemplary case where one of the dots based on the original image data is deleted and is replaced with a dot having a diameter smaller than the diameter of the original dot. The pattern 81F illustrates an exemplary case where the dots based on the original image are deleted.

In the present embodiment, the type of the edge correction set in the output condition information 621 may be, for example, the types of the patterns 81A to 81F illustrated in FIG. 8B.

Next, a process of the liquid discharge apparatus 1 according to the present embodiment will be described referring to FIG. 9. FIG. 9 is a flowchart illustrating the process of the liquid discharge apparatus according to the first embodiment.

The liquid discharge apparatus 1 according to the present embodiment determines whether an instruction for outputting the evaluation medium having irregularities of a predetermined pattern formed by the image processing unit 630 is received (step S901).

In step S901, when the output instruction is not received, the liquid discharge apparatus 1 enters a standby state.

In step S901, when the output instruction is received, the liquid discharge apparatus 1 starts to convey the evaluation medium (step S902). Note that the evaluation medium may be an arbitrary discharge target object 500. For example, the evaluation medium may be the discharge target object 500 or the like which the user of the liquid discharge apparatus 1 intends to use in the future.

Subsequently, the liquid discharge apparatus 1 refers to the output condition holding unit 620 to obtain the output condition information 621 using the image processing unit 630, and generates image data of a predetermined pattern image for each output condition set in the output condition information 621 (step S903).

Subsequently, the liquid discharge apparatus 1 causes the liquid discharge head 34 to discharge the embossing ink according to the generated image data using the liquid discharge control unit 640, and forms the predetermined pattern image on the discharge target object 500 using the embossing ink (step S904).

Subsequently, the liquid discharge apparatus 1 dries the discharge target object 500 on which the embossing ink is adhered using the dryer 25 (step S905), outputs the discharge target object 500 (step S906), and terminates the process.

In this manner, according to the present embodiment, the predetermined pattern image is formed on the discharge target object 500 using the embossing ink for each output condition and is dried, whereby the evaluation medium having the irregularities of the predetermined pattern for each output condition can be output.

Figure 10:
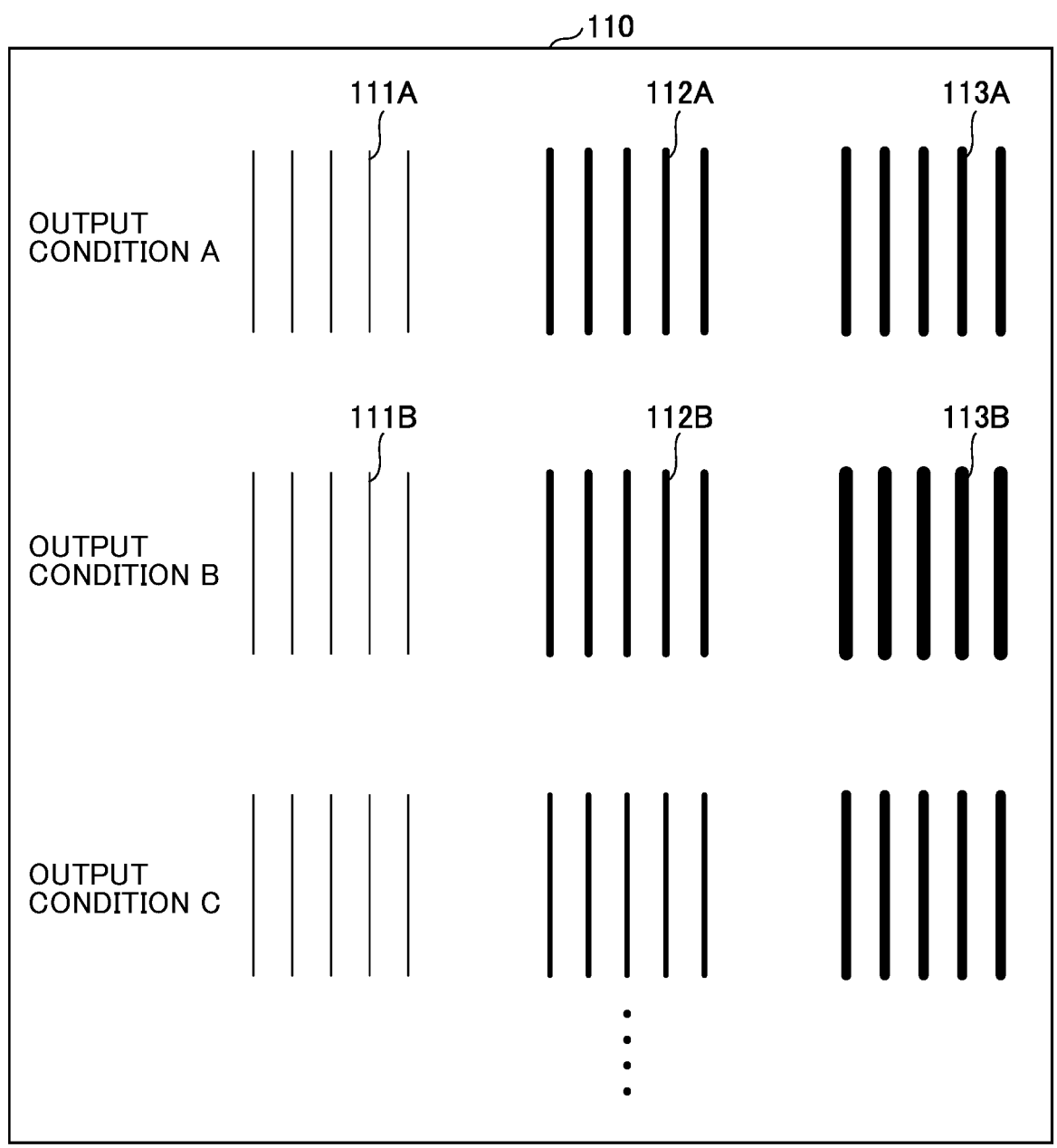
FIG. 10 is a diagram illustrating an exemplary evaluation medium.

FIG. 10 is a diagram illustrating an exemplary evaluation medium. Irregularity patterns corresponding to the pair line images formed by the embossing ink for each output condition included in the output condition information 621 are formed on an evaluation medium 110 illustrated in FIG. 10.

For example, in the evaluation medium 110, irregularity patterns 111A, 112A, and 113A associated with the output condition A, and irregularity patterns 111B, 112B, and 113B associated with the output condition B are formed.

The irregularity pattern 111A is an irregularity pattern corresponding to the one-dot pair line image formed as a result of discharging the embossing ink onto the discharge target object 500 on the basis of the output condition A. The irregularity pattern 112A is an irregularity pattern corresponding to the two-dot pair line image formed according to the output condition A, and the irregularity pattern 113A is an irregularity pattern corresponding to the four-dot pair line image formed according to the output condition A.

Similarly, the irregularity pattern 111B is an irregularity pattern corresponding to the one-dot pair line image formed as a result of discharging the embossing ink onto the discharge target object 500 according to the output condition B. The irregularity pattern 112B is an irregularity pattern corresponding to the two-dot pair line image formed according to the output condition B, and the irregularity pattern 113B is an irregularity pattern corresponding to the four-dot pair line image formed according to the output condition B.

As described above, according to the present embodiment, the evaluation medium 110 is output, whereby the user of the liquid discharge apparatus 1 can grasp the output condition corresponding to the desired irregularity pattern (state). Therefore, according to the present embodiment, reproducibility of the irregularities can be improved.

Second Embodiment

Hereinafter, a second embodiment will be described referring to the accompanying drawings. The second embodiment is different from the first embodiment in that a state of irregularities on an evaluation medium for each output condition is evaluated and a liquid discharge apparatus 1 holds information indicating an evaluation result. Accordingly, in the following descriptions of the second embodiment, functional configurations similar to those in the first embodiment are denoted by similar reference signs used in the first embodiment, and descriptions thereof will be omitted.

Figure 11:
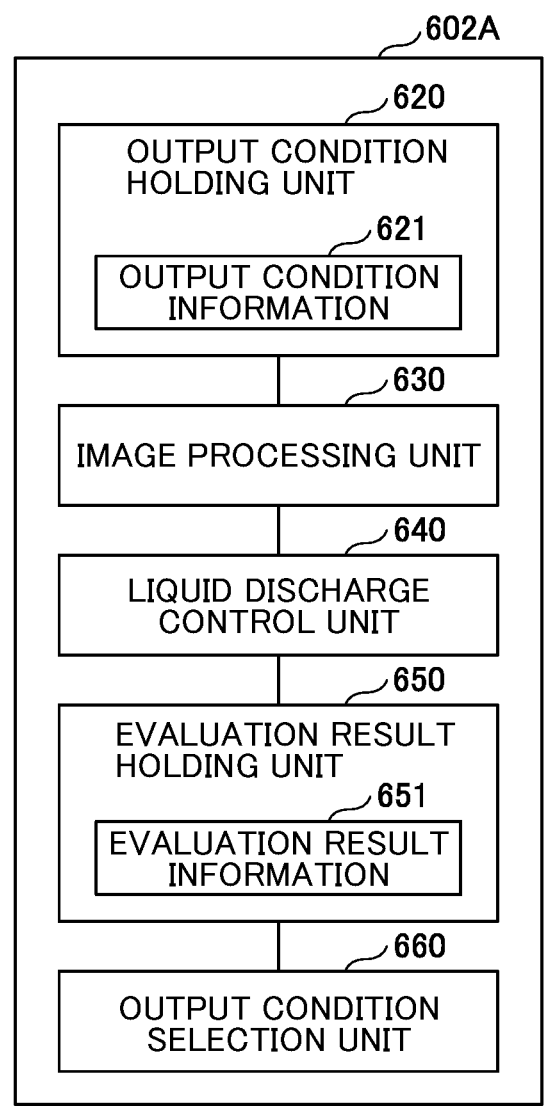
FIG. 11 is a diagram illustrating a function of a CPU of a liquid discharge apparatus according to a second embodiment.

FIG. 11 is a diagram illustrating a function of a CPU of a liquid discharge apparatus according to the second embodiment. A CPU 602A according to the present embodiment includes, in addition to an output condition holding unit 620, an image processing unit 630, and a liquid discharge control unit 640, an evaluation result holding unit 650, and an output condition selection unit 660.

The evaluation result holding unit 650 holds evaluation result information 651 indicating an evaluation result of a state of irregularities on an evaluation medium for each output condition. Details of the evaluation result information 651 will be described later.

The output condition selection unit 660 selects an output condition of a discharge target object 500 according to the evaluation result information 651.

Hereinafter, the evaluation result information 651 according to the present embodiment will be described referring to FIGS. 12 and 13. FIG. 12 is a first table illustrating exemplary evaluation result information according to the second embodiment.

In evaluation result information 651-1 illustrated in FIG. 12, results of evaluations of a state of an irregularity pattern corresponding to a one-dot pair line image, a state of an irregularity pattern corresponding to a two-dot pair line image, and a state of an irregularity pattern corresponding to a four-dot pair line image are associated with each other for each of output conditions A to L.

Note that the evaluation result information 651-1 in FIG. 12 illustrates, for example, states of irregularities on an evaluation medium 110, which are results of visual evaluations by a person.

According to FIG. 12, for example, all irregularity patterns based on three types of pair line images are in a favorable state under the output condition H. In the example of FIG. 12, under the output condition L, for example, while a state of an irregularity pattern based on the one-dot pair line image is not favorable, states of irregularity patterns based on the two-dot pair line image and the four-dot pair line image are favorable.

FIG. 13 is a second table illustrating exemplary evaluation result information according to the second embodiment. Evaluation result information 651-2 in FIG. 13 illustrates a result in which, for example, a brightness image correlated with irregularities is obtained by a camera, a sensor, or the like and a profile indicating a profile of the irregularities is obtained from the brightness image. In the example of FIG. 13, the profile of the irregularities include, as items, a depth of the irregularities, sharpness of an edge, and smallness of crushing.

A value of the item "depth of irregularities" is a value indicating a degree of the depth of the irregularities, and the larger this value is, the clearer the irregularities are, which indicates the state is favorable. A value of the item "sharpness of edge" is a value indicating a degree of sharpness of the edge of the irregularity, and the larger this value is, the sharper the edge of the irregularity is. A value of the item "smallness of crushing" is a value indicating a degree of crushing of a projected portion and a recessed portion in the irregularities, and the larger this value is, the less the irregularities are crushed and the outline is clearer.

Accordingly, in the profile illustrated in FIG. 13, the larger the total value of the values of each item is, the more satisfactory the depth of the recessed portion is, and also the clearer the outline is, which indicates the favorable state.

In the evaluation result information 651-2 illustrated in FIG. 13, the profile corresponding to each dot pair line image and the total value of the values of respective profile items for each output condition are associated with each other for each of the output conditions A to L.

In the example of FIG. 13, the total value is the largest under the output condition H. Therefore, in the evaluation result information 651-2, the output condition H should be selected to form the irregularities corresponding to the respective dot pair line images in the favorable state.

In the profile, a user of the liquid discharge apparatus 1 may set a priority level of each item in advance, and the value of each item may be weighted according to the priority level.

Further, in the present embodiment, the item to be prioritized in a case where the total values of the items of different output conditions are the same may be set in advance, for example. Specifically, in the case where the total values of the items of different output conditions are the same, for example, the output condition having larger value of the item "smallness of crushing" may be prioritized, or the output condition having less consumption of embossing ink may be prioritized.

Figure 14:
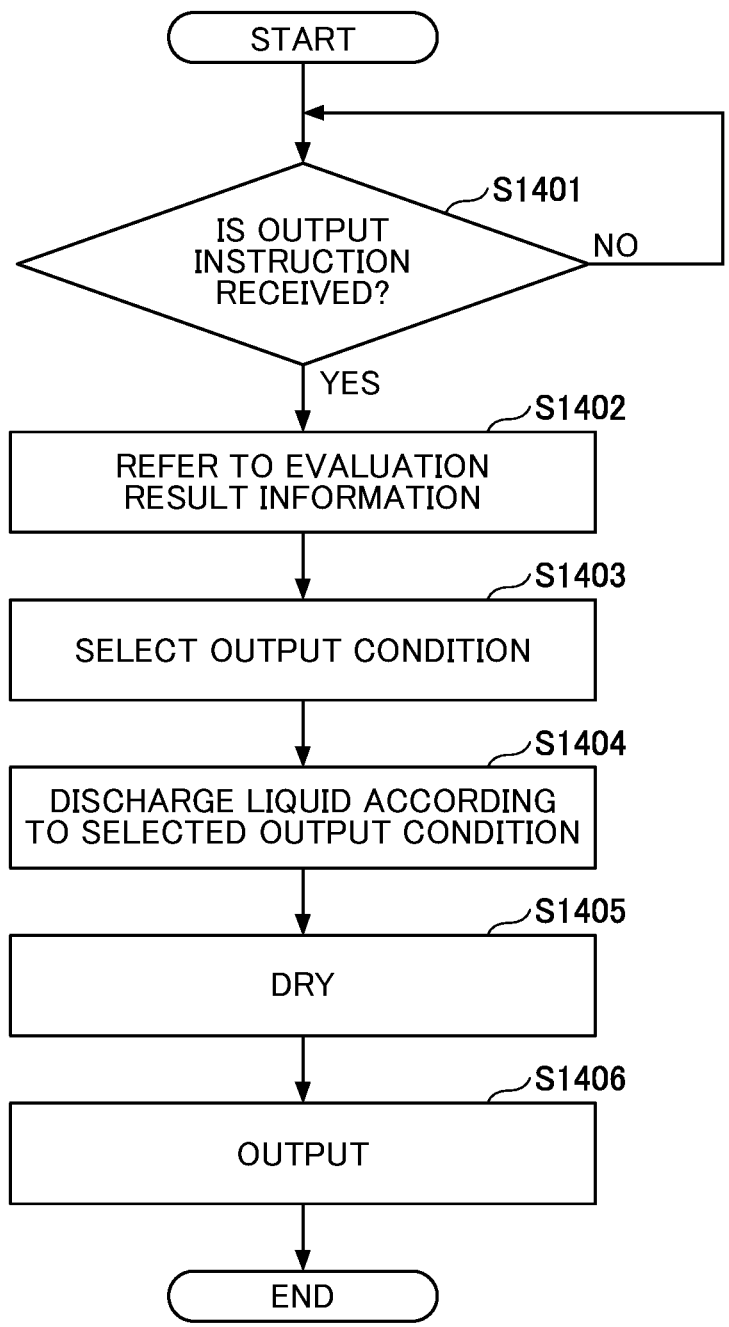
FIG. 14 is a flowchart illustrating processing of the liquid discharge apparatus according to the second embodiment.

Hereinafter, a process of the liquid discharge apparatus 1 according to the present embodiment will be described referring to FIG. 14. FIG. 14 is a flowchart illustrating processing of the liquid discharge apparatus according to the second embodiment.

The liquid discharge apparatus 1 according to the present embodiment determines whether an instruction for outputting the discharge target object 500 (instruction for printing) is received (step S1401). When the output instruction is not received in step S1401, the liquid discharge apparatus 1 enters a standby state.

When the output instruction is received in step S1401, the output condition selection unit 660 of the liquid discharge apparatus 1 refers to the evaluation result information 651 of the evaluation result holding unit 650 (step S1402).

Subsequently, the output condition selection unit 660 selects, in the evaluation result information 651, the output condition for forming the irregularities in the most favorable state (step S1403). Subsequently, the liquid discharge control unit 640 controls a liquid discharge head 34 according to the selected output condition to discharge the embossing ink onto the discharge target object 500 (step S1404), and the process proceeds to step S1405.

Processing of steps S1405 and S1406 is similar to the processing of steps S905 and S906 of FIG. 9, and thus the descriptions thereof will be omitted.

Note that the evaluation result information 651 according to the present embodiment may be held in the evaluation result holding unit 650 in a state in association with the type of the discharge target object 500. This can be implemented by outputting the evaluation medium for each type of the discharge target object 500, obtaining the evaluation result information 651 of the state of the irregularities on the output evaluation medium, and causing the evaluation result holding unit 650 to hold the evaluation result information 651 and the type of the evaluation medium in association with each other.

In the case where the evaluation result information 651 is held for each type of the discharge target object 500 as described above, upon selection of the type of the discharge target object 500, for example, the output condition selection unit 660 according to the present embodiment may refer to the evaluation result information 651 corresponding to the selected type to select the output condition.

As described above, according to the present embodiment, the evaluation medium on which a test pattern for evaluation is formed with different conditions (output conditions) related to image formation using the embossing ink is printed, and the condition selected on the basis of the evaluation medium is reflected on the liquid discharge apparatus 1, whereby high-quality emboss processing can be performed and reproducibility of the irregularities can be improved.

Since a heating temperature and time of polyvinyl chloride and the like may be factors for controlling the shape of the irregularities, the output condition information 621 according to the present embodiment may include those items as information items. Specifically, at the time of outputting the evaluation medium, for example, the heating temperature and time of the discharge target object 500 may be made different, and may be held as the output condition information 621.

Although the present invention has been described on the basis of the respective embodiments, the present invention is not limited to the requirements described in the above embodiments. Those requirements can be modified without departing from the gist of the present invention, and can be appropriately determined according to the application form.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A liquid discharge apparatus, comprising:
  a liquid discharge head configured to discharge, to a foamable medium, liquid having a function of suppressing foaming of the medium, thus causing formation of irregularities on the medium; and
  processing circuitry configured to
    store condition information indicating a content defined by each of a plurality of conditions related to image formation at a time when the liquid forms a predetermined pattern image on the medium; and generate and output, for each condition of the plurality of conditions, an evaluation medium on which the irregularities, which correspond to the predetermined pattern image formed according to the condition, are formed.

2. The liquid discharge apparatus according to claim 1, wherein each condition stored by the processing circuitry is defined by first information including information indicating an amount of adhesion of the liquid on the medium and second information related to a shape of an outline of the pattern image formed on the medium by the liquid.

3. The liquid discharge apparatus according to claim 2, wherein the pattern image includes a plurality of types of pattern images, and
irregularities corresponding to the plurality of types of pattern images are formed on the generated evaluation medium for each of the conditions.

4. The liquid discharge apparatus according to claim 3, wherein the processing circuitry is further configured to:
store, for each condition of the plurality of conditions, evaluation result information indicating a result of evaluation of a state of the irregularities formed on the evaluation medium;
select the condition according to a result indicated by the evaluation result information; and
control the liquid discharge head to discharge the liquid according to the selected condition.

5. The liquid discharge apparatus according to claim 4, wherein the processing circuitry is further configured to
store the evaluation result information for each type of the medium, and
refer to, when a designation of a particular type of the medium is received, particular evaluation result information corresponding to the designated type to select the condition.

6. The liquid discharge apparatus according to claim 5, wherein the condition related to the image formation includes a condition defined by first information indicating a heating temperature of the medium and second information indicating a heating period of time of the medium.

7. The liquid discharge apparatus of claim 1, wherein the processing circuitry is configured to generate, for each condition of the plurality of conditions, the evaluation medium on which the irregularities are formed, the irregularities being formed by the discharge of the liquid according to the condition.

8. A liquid discharge apparatus, comprising:
a liquid discharge head configured to discharge, to a foamable medium, liquid having a function of suppressing foaming of the medium, thus causing formation of irregularities on the medium;
a sample evaluation circuitry configured to
generate a plurality of pattern images on a sample of the foamable medium by discharging the liquid based on a plurality of conditions,
evaluate the pattern images and the conditions, and
store evaluated information indicating a relationship between the pattern images and conditions; and
processing circuitry configured to
discharge the liquid to the foamable medium based on the evaluated information to form a desired irregularity.

9. The liquid discharge apparatus according to claim 8, wherein the sample evaluation circuitry is configured to generate the plurality of pattern images by discharging the liquid based on the plurality of conditions, which include a graduation value and a status of an edge processing.

10. The liquid discharge apparatus according to claim 8, wherein the sample evaluation circuitry is configured to store the evaluated information, which includes a status of the pattern image.

11. The liquid discharge apparatus according to claim 10, wherein the sample evaluation circuitry is configured to store the evaluated information, which includes the status of the pattern image, which includes a depth of the pattern image, an edge status of the pattern image, and a crushing status of the pattern image.

12. The liquid discharge apparatus according to claim 8, wherein the sample evaluation circuitry is configured to store the evaluated information, which is a digitization value.

13. The liquid discharge apparatus according to claim 8, further comprising a drying apparatus configured to dry the foamable medium.

* * * * *